United States Patent Office 3,354,112
Patented Nov. 21, 1967

3,354,112
PROCESS FOR PREPARING FLUID, NON-PLASTICIZED VINYL CHLORIDE POLYMER COMPOSITIONS AND THERMOSET POLYMERS HAVING REINFORCING FIBROUS MATERIAL EMBEDDED THEREIN
John P. Bruce, Cumberland, Md., assignor to The Dow Chemical Company, Midland, Mich., a corporation of Delaware
No Drawing. Filed Jan. 25, 1965, Ser. No. 427,951
9 Claims. (Cl. 260—32.8)

This invention relates to fluid, non-plasticized, vinyl chloride polymer compositions capable of being converted to thermoset polymeric products, and to a method of preparing the same.

A thermoplastic resin which can be made into thermoset polymer is useful for a variety of purposes. Among such uses is the manufacture of molded parts where the resin must be easily manipulatable before setting and comparatively immobile after it has been given its final shape. Such resins are further advantageously use for preparing thermoset polymer having reinforcing fibrous material embedded therein.

One method for making molded or shaped articles from plastic materials consists in: blending or dispersing a finely divided polymeric material, e.g., polyvinyl chloride, in a liquid plasticizer to form a flowable mixture which can be poured into a mold; heating to fuse or solvate the polymer with the plasticizer; and subsequently cooling the heated material to produce a shaped article conforming to the configuration of the mold. Such polymeric dispersions are known in the art as plastisols. Articles prepared from plasticized polymers, particularly plastisols, are usually relatively soft, flexible products which greatly restricts their utililty.

Cross-linked or rigid polymeric compositions are generally prepared by blending a finely divided polymer, such as polyvinyl chloride, with a difunctional monomer (i.e. a monomer containing two ethylenically unsaturated groups in the molecule, and capable of addition polymerization) to form a fluid composition or plastisol, and thereafter shaping the plastisol and heating the same to fuse the polymer, followed by curing or polymerizing the difunctional monomer to produce a rigid cross-linked polymeric article. Thus, it is often necessary to first prepare the required polymer and subsequently react the same with one or more suitable difunctional monomers.

It is an object of the present invention to provide fluid, non-plasticized vinyl chloride polymer compositions capable of being converted to thermoset polymers and, correspondingly, to provide such thermoset polymers.

Another object is to provide such thermoset polymers having reinforcing fibrous material embedded therein.

Other and related objects will become apparent from the following description of the invention. The foregoing and related objects can be attained by:

(I) Forming a mixture composed essentially of:

(a) from between about 12 to 60 percent by weight of vinyl chloride monomer,
(b) from between about 6 and 15 percent by weight of at least one monovinyl aromatic compound, as herein described,
(c) from between about 1 and 5 percent by weight of at least one of the polyethylenically unsaturated monomers as herein described,
(d) from between about 1 and 5 percent by weight of acrylonitrile, and
(e) from between about 15 and 80 percent by weight of at least one of the non-polymerizable organic solvents as described herein; and (II) Polymerizing the monomeric constitutents of the mixture to substantial completion, i.e. at least about 95 percent conversion of monomer to polymer, in the presence of catalytic amounts of a free-radical initiating agent, to form a substantially linear, polymeric material which is soluble in the designated solvent component of the fluid composition.

The resulting fluid vinyl chloride polymer compositions are capable of being converted into thermoset polymeric products (following the substantial removal of the non-polymerizable organic solvent) and are particularly suitable for preparing rigid, essentially transparent resin laminates having fibrous reinforcing material embedded therein.

The monovinyl aromatic compounds to be employed in the invention are the liquid monomers of the benzene series having the general formula:

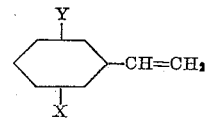

wherein X and Y represent a member of the group consisting of hydrogen, halogen and lower alkyl radicals containing from 1 to 3 carbon atoms. Exemplary of such monomers are: styrene, vinyl toluene, vinylxylene, ethylvinylbenzene, isopropylstyrene, chlorostyrene, dichlorostyrene, bromostyrene, fluorostyrene, ar-ethyl ar-chlorostyrene, ar-methyl ar-chlorostyrene and diethylstyrene.

The solvent employed in the preparation of the fluid composition of the present invention is selected from those non-polymerizable organic materials capable of effectively dissolving the herein defined monomers when used in the amounts specified. Exemplary of such preferred solvents are the non-polymerizable organic ketones such as acetone and methyl ethyl ketone.

The free-radical initiating agents employed in the present invention may be selected from any such materials known to those skilled in the art. Exemplary of preferred catalysts are: azobisisobutyronitrile, benzoyl peroxide, lauroyl peroxide, hydrogen peroxide, and potassium persulfate, among many others. The free-radical initiating agents are preferably used in amounts of from between about 0.28 and 0.4 percent by weight, based on the total weight of the reaction mixture.

The monomeric constituents of the reaction mixture are polymerized utilizing elevated temperatures and preferably those temperatures between about 75° C. and 100° C. for optimum control of reaction rate. Additionally, the polymerization is accomplished utilizing pressures sufficient to prevent volatilization of the reaction constituents. In general, pressures up to about 300 pounds per square inch are preferred.

Following substantial completion of polymerization residual unreacted monomeric materials, and/or solvent may be removed, if desired, by volatilization utilizing temperatures of up to about 50° C. under reduced pressure, i.e. pressure of from about 15 to 20 millimeters of mercury.

Generally, however, it is unnecessary to devolatilize residual monomer materials to provide fluid compositions which can readily be poured or forced into a mold cavity, spread as a layer on a flat plate or belt or on a mat or sheet of fibrous material such as cloth, wood fibers, cotton linters, glass fibers, glass cloth, paper and the like, then pressed and cured to form molded rigid articles or laminates suitable for a variety of purposes.

In a specific embodiment, the fluid compositions are employed to impregnate or coat fibrous materials such as a mat or woven cloth of glass fibers to produce rigid vinyl chloride polymer products having the fibrous material embedded therein.

The fluid compositions comprising the soluble polymeric material are converted to rigid, thermoset polymeric products upon substantial removal of the solvent and subsequent heating of the residual polymeric material at a temperature of about 135° C. or above with the application of from between about 135 to 550 pounds per square inch of pressure. Generally, a period of about 30 minutes, utilizing the above stated conditions of temperature and pressure, is required for conversion of the substantially linear polymer composition into a rigid, thermoset polymeric product.

It is to be understood, however, that other means for converting the substantially linear polymeric material into rigid, thermoset products may be employed. Thus, such thermoset products may be obtained by subjecting the substantially linear polymers of the fluid compositions of the present invention to the action of high energy ionizing radiations, such as high speed electrons, gamma ray, X-rays and the like. Convenient sources of such radiation are Van de Graff generators, Cobalt-60 and X-ray machines. The high energy radiation as conventionally employed is preferably of an intensity corresponding to at least 40,000 rads per hour and is used in amounts corresponding to a total dose of from about 0.4 to 10 megarads.

The following example illustrates the present invention but is not to be construed as limiting its scope.

*Example*

A composition was prepared by blending the hereinafter designated amounts of the following materials in a pressure type reactor equipped with means for stirring and for controlling and recording temperature and pressure.

|  | Grams | Percent by Weight |
|---|---|---|
| Vinyl Chloride | 9,500 | 54.2 |
| Styrene | 1,500 | 8.55 |
| Allyl Acrylate | 750 | 4.27 |
| Acrylonitrile | 750 | 4.27 |
| Acetone | 5,000 | 28.5 |
| Azobisisobutyronitrile | 50 | 0.285 |

The reaction vessel was then purged with nitrogen, sealed, and heated to 81° C. for a period of about 14 hours to form an essentially linear, acetone-soluble polymer, representing a conversion of monomer to polymer of about 95 percent. Following such digestion period, the reactor was heated at 45° C. for a period of 30 minutes under a pressure of between about 15 and 20 millimeters of mercury to remove all residual monomeric vinyl chloride.

The resulting solution was subsequently diluted to 34.71 percent solids with acetone and poured onto a glass mat approximately 6 feet in length and 38 inches wide. The impregnated glass mat was then air dried for a period of about 24 hours to remove the acetone and subsequently cut into individual sections or "plates" approximately 6 inches long and 6 inches wide.

Laminate materials were then prepared by placing 12 impregnated glass mat plates (6" long by 6" wide) in a hydraulic press operating at a temperature of about 150° C. and 300 p.s.i. pressure for a period of about 30 minutes.

The following table illustrates the physical properties of the laminate material.

TABLE

| Physical Property | A.S.T.M. Test Method | Value |
|---|---|---|
| Flexural Strength | D 790-59T | 47,800 p.s.i. |
| Flexural Modulus | D 790-59T | $2.1 \times 10^6$. |
| Flammability | D 635-56T | Self-extinguishing. |

Similar good results are obtained utilizing fluid vinyl chloride compositions prepared utilizing any of the herein described reaction components and procedures.

What is claimed is:

1. A method for preparing a fluid, non-plasticized, vinyl chloride polymer composition capable of being converted to a thermoset product which comprises:
  (I) preparing a mixture of
    (a) from between about 12 and 60 percent by weight of vinyl chloride,
    (b) from between about 6 and 15 percent by weight of at least one monovinyl aromatic compound having the formula

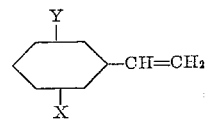

wherein X and Y each represent a member of the group consisting of hydrogen, halogen and lower alkyl radicals containing from 1 to 4 carbon atoms,
    (c) from between about 1 and 5 percent by weight of at least one polyethylenically unsaturated monomer selected from the group consisting of allyl acrylate and allyl methacrylate,
    (d) from between about 1 and 5 percent by weight of acrylonitrile, and
    (e) from between about 15 and 80 percent by weight of a non-polymerizable organic ketone solvent therefor, and
  (II) polymerizing the monomeric constituents of said mixture to substantial completion in the presence of catalytic amounts of a free-radical initiating agent while utilizing autogeneous pressure and a temperature between about 75 and 100° C.

2. The process of claim 1, wherein said organic ketone is acetone.

3. The process of claim 1, and including in addition thereto and in combination therewith, the steps of devolatilizing said non-polymerizable organic solvent and converting said fluid vinyl chloride polymer to a thermoset polymer by heating the same at a temperature of at least about 135° C. under an applied pressure of between about 135 to 550 p.s.i. for a period of at least about 30 minutes.

4. The process of claim 3, and including in addition thereto and in combination therewith, the step of impregnating a fibrous reinforcing material with said fluid vinyl chloride polymer prior to converting said polymer to a thermoset polymer.

5. The process of claim 4, wherein said fibrous reinforcing material consists essentially of glass fibers.

6. A method of preparing a fluid vinyl chloride polymer composition capable of being converted to a thermoset product which comprises:
  (I) forming a mixture composed essentially of:
    (a) from 12 to 60 percent by weight vinyl chloride,
    (b) from 6 to 15 percent by weight styrene,
    (c) from 1 to 5 percent by weight allyl acrylate,
    (d) from 1 to 5 percent by weight acrylonitrile,
    (e) from 15 to 80 percent by weight acetone, and
  (II) polymerizing the monomers of said mixture to substantial completion in the presence of catalytic amounts of a free-radical imitating agent while utilizing autogeneous pressure and a temperature between about 75 and 100° C. to form a substantially linear acetone-soluble polymeric material.

7. A fluid vinyl chloride polymer composition prepared by the process of claim 1.

8. A thermoset vinyl chloride polymer composition prepared by the process of claim 3.

9. A glass fiber reinforced thermoset vinyl chloride polymer composition prepared by the process of claim 5.

References Cited

UNITED STATES PATENTS 2,605,257  7/1952  Wolf et al. _____ 260—80.5
2,646,417  7/1953  Jennings _____ 260—80.5

OTHER REFERENCES

53 Chem. Abstracts 7673d (1959).

MORRIS LIEBMAN, *Primary Examiner.*

R. S. BARON, *Assistant Examiner.*